United States Patent [19]

Ball

[11] 3,957,085

[45] May 18, 1976

[54] FLEXIBLE ARTICLES

[75] Inventor: Eric Ball, Newcastle-upon-Tyne, England

[73] Assignee: Dunlop Holdings Limited, London, England

[22] Filed: Mar. 26, 1974

[21] Appl. No.: 454,828

Related U.S. Application Data

[63] Continuation of Ser. No. 142,998, May 13, 1971, abandoned.

[30] Foreign Application Priority Data

May 21, 1970 United Kingdom............... 24694/70

[52] U.S. Cl............................... 138/129; 138/137
[51] Int. Cl.$^2$......................................... F16L 11/08
[58] Field of Search ........... 138/129, 130, 132, 137, 138/DIG. 2

[56] References Cited

UNITED STATES PATENTS

| 1,668,560 | 5/1928 | Healy.................................. 138/137 |
| 2,168,366 | 8/1939 | Slayter........................... 138/132 X |
| 3,312,250 | 4/1967 | Sirignano et al................ 138/129 X |
| 3,502,113 | 3/1970 | Bjorksten.......................... 138/129 |
| 3,502,114 | 3/1970 | Hay, Jr. ............................. 138/129 |
| 3,616,123 | 10/1971 | Reynolds, Jr. et al.......... 138/129 X |

*Primary Examiner*—Richard C. Queisser
*Assistant Examiner*—Charles Gorenstein
*Attorney, Agent, or Firm*—Stevens, Davis, Miller & Mosher

[57] ABSTRACT

A flexible article, such as a hose pipe, which comprises a body including polymeric material and having a surface layer of non-woven filamentary material applied to the body, the filamentary material being impregnated with a polymeric material.

12 Claims, 4 Drawing Figures

FLEXIBLE ARTICLES

This is a continuation of application Ser. No. 142,998, filed May 13, 1971, now abandoned.

This invention relates to flexible articles and particularly, but not exclusively, to hose pipes.

In the manufacture of flexible articles in the form of hose pipes it may be required to form a radially inner surface layer, or lining layer of extruded polymeric material.

Generally, such surface layers are required to afford adequate protection of the surfaces of the hose body.

One object of the present invention is to provide a flexible article having an improved surface layer.

According to one aspect of the invention a flexible article comprises a body including polymeric material and having a surface layer of non-woven filamentary material applied to the body, the filamentary material being impregnated with a polymeric material.

According to another aspect of the invention a method of manufacture of a flexible article comprises arranging adjacent a surface of a body of the flexible article a surface layer of non-woven filamentary material, impregnated with a polymeric material, and bonding the surface layer to the said surface.

In the manufacture of a hose pipe, surface layers as defined above may constitute respectively inner and outer layers of the hose pipe, and in the manufacture of a conveyor belt both upper and lower surfaces of the belt may be covered by such layers.

In the manufacture of a flexible article such as a hose pipe it is preferable that surface layers of non-woven material, impregnated with a polymeric material, are utilized to provide both a lining and a cover layer. This provides a hose pipe of relatively small wall thickness compared with conventional hose pipes of a similar strength.

One embodiment of the invention will now be described by way of example with reference to the accompanying drawings in which.

Figure 1:
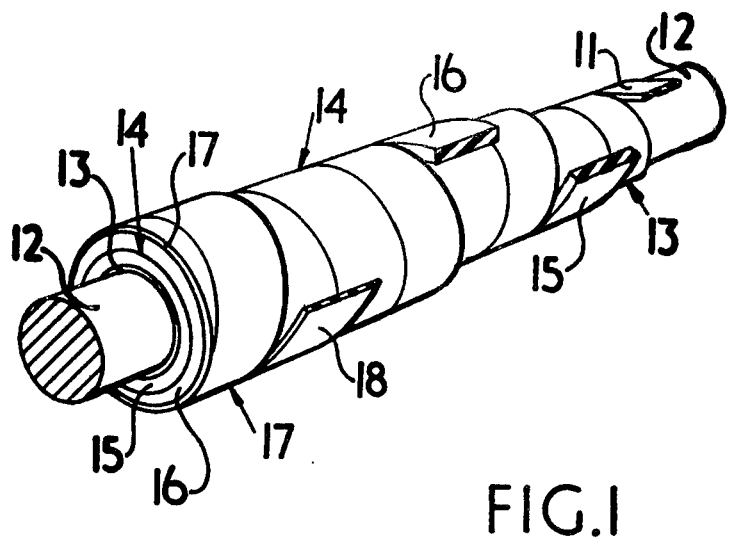
FIG. 1 is a perspective view (not to scale) showing the arrangement of wound strips in one form of reinforced hose pipe.

The hose pipe illustrated in FIG. 1 is manufactured by helically winding a strip 11 of polymer impregnated non-woven filamentary material onto a mandrel 12 so as to form a radially inner lining layer 13. A reinforced body 14 of the hose pipe is then formed by helically winding onto the lining layer 13 a first reinforcing strip 15 in an opposite sense to the lining strip 11 and winding a second reinforcing strip 16 onto the first reinforcing strip 14 in an opposite sense thereto. A cover layer 17 for the hose pipe is formed by a strip 18 of polymer impregnated non-woven material helically wound onto the reinforced body 14 in an opposite sense to the second reinforcing strip 16.

The hose pipe assembly is subsequently vulcanized on the mandrel in a conventional manner and then removed from the mandrel.

The strips 11,18 of non-woven filamentary material preferably have a thickness of between 0.003 of an inch and 0.010 of an inch, and each may be formed from a layer of randomly disposed nylon filaments to which a solvent, in either liquid or vapor form, is applied to bond the filaments together at their cross-over points, thereby to form a substantially unitary porous strip. A suitable material is sold under the name CEREX (Registered Trade Mark). Subsequently the porous strips of non-woven filamentary material are impregnated with a polymeric material such as latex rubber which is caused to wet the nylon filaments and thereby form an integral and substantially impermeable layer of rubber-impregnated nylon filaments. Impregnation may be effected by dipping the nylon layer into latex rubber or may be carried out in any other convenient way such as by spraying, spreading, or roller application.

Figure 2:
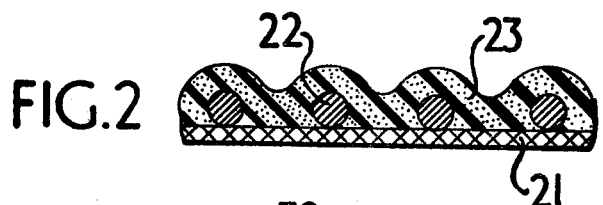
FIG. 2 is a cross-sectional view of one form of reinforcing strip.

One of the reinforcing strips 15,16 is shown in cross-section in FIG. 2 and comprises a porous support layer 21 of non-woven filamentary material, such as of the kind described in the preceding paragraph, with a layer of parallel longitudinally extending nylon reinforcing filaments 22 overlying the support layer. The two layers are impregnated with rubber latex 23 to form the composite strip.

Figure 3:
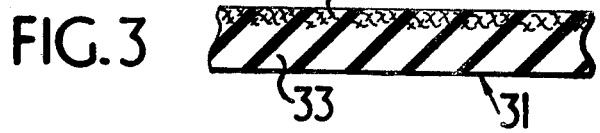
FIG. 3 is a cross-sectional view of a strip of impregnated filamentary material having a surface film of polymeric material.

In a second embodiment of the invention a hose pipe is constructed substantially as described in respect of the preceding embodiment except that the strips of impregnated filamentary material are of a modified construction, as illustrated in FIG. 3.

Strips 31 of non-woven material, preferably of a thickness in the range 0.003 of an inch to 0.010 of an inch, are each formed from a layer of randomly disposed nylon filaments 32 which have been subjected to the combined action of heat and pressure to weld the filaments together at their cross-over points and thereby form a substantially unitary porous sheet. A surface film 33 of polymeric material such as a latex rubber is then applied to one side of the matrix material and is caused to penetrate the non-woven filamentary material and wet the nylon filaments. Thus the filamentary material is impregnated with the latex rubber and securely bonded to the adjacent film 33 of latex rubber.

During assembly of the hose pipe the inner surface layer, or lining layer, is wound helically with the impregnated filamentary material adjacent the mandrel, and a reinforced body is formed around the latex rubber surface film 33 of the lining by a pair of helically wound reinforcing strips. An outer layer, or cover is formed by helically winding a second strip of the impregnated material around the reinforced body, the latex rubber surface film 33 being arranged adjacent the reinforced body so that in the assembled and vulcanized hose pipe the impregnated non-woven material of nylon filaments 32 forms a radially outer surface which protects the hose pipe.

Figure 4:
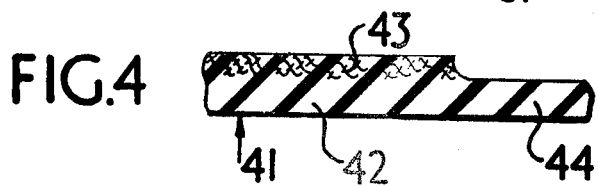
FIG. 4 is a cross-sectional view of a modified form of the strip shown in FIG. 3.

In a third embodiment of the invention a hose pipe is constructed substantialy as described in respect of the second embodiment except that the strip of non-woven filamentary material is of a modified construction, as illustrated in FIG. 4 of the accompanying drawings. A strip 41 of impregnated filamentary material comprises a surface film 42 of polymeric material which extends beyond an edge of the layer of non-woven nylon filaments 43 as a portion 44 unsupported by the filamentary material. Thus, when a surface layer of the hose pipe is formed by helically winding a strip of the impregnated filamentary material the unsupported portion 44 of the surface film may be arranged to form an overlap between the adjacent windings Irrespective of whether or not the impregnated filamentary material is formed with a surface film having an unsupported portion a lining or cover layer of a hose pipe may be formed with an overlapped construction in which, for example, a strip of impregnated filamentary material is:

a. wound helically with an overlap to produce a layer of more than two plies;
b. wound helically with a 50% overlap to produce a two-ply layer;
c. wound helically with a nominal edge overlap to produce a layer of substantially single ply, or
d. applied longitudinally relative to the length of the hose and overlapped to produce a layer of one or more plies.

While in the embodiments described the non-woven material is formed from nylon filaments, the filaments may be of other polyamide materials or other synthetic materials such as polyesters, polypropylene, rayon, or may be of spun yarn, metal wire, or glass fiber. Alternatively the non-woven material may be a paper which is absorbent and porous to the impregnating material so as to be firmly bondable thereto.

Figure 5:
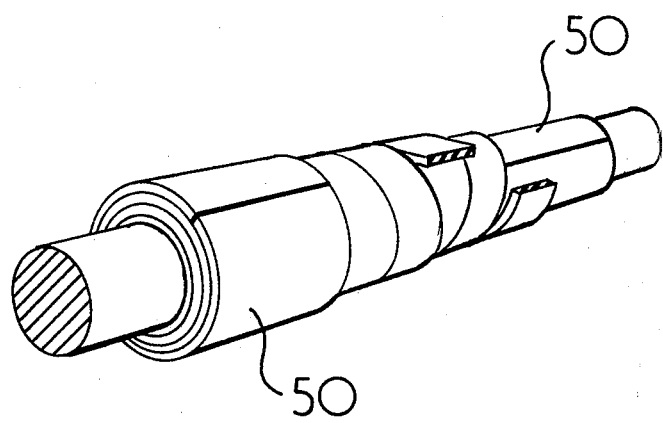
FIG. 5 is a perspective view (not to scale) of a hose having longitudinally extending strips as surface layers.

The non-woven material need not be applied helically relative to the longitudinal axis of the hose pipe. In an alternative arrangement (illustrated in FIG. 5) either or both of the surface layers 50 may be formed from one or more strips of impregnated material applied substantially parallel to the longitudinal axis of the hose pipe, and the edges of the strips may be overlapped if desired.

Alternative constructions of reinforcing strips incorporating a layer of non-woven material are described in the specifications of the assignee's co-pending patent application Ser. No. 108,728 of Jan. 22, 1971. The reinforced body of the hose may be formed from reinforcing strips of this general kind or of any other suitable construction, comprising, for example, wrapped, braided or helically wound plies of woven, knitted or other desired reinforcing material.

A particular feature of the present invention is that it provides a surface layer which essentially has the advantageous properties of a textile material in combination with the properties of a homogeneous elastomeric or thermoplastic material and therefore has a smaller thickness than a conventional surface layer of textile material of similar strength and durability. In particular the surface layer has an increased toughness, an enhanced resistance to abrasion, tearing, cutting and cut-growth, and a reduced weight and thickness. These characteristics are particularly advantageous in both industrial hoses and other hoses such as hoses for fire fighting.

The improved properties of the surface layers described in this specification are obtained by the use of a polymeric impregnating material which wets the thin layer of non-woven filamentary material and thereby forms a layer of integral or substantially unitary construction within the general thickness of the non-woven material.

The invention thus provides a hose pipe having a surface layer which is thinner than previously known constructions of a similar strength and durability. In consequence there is a reduction in the thickness of the hose pipe and corresponding economies of weight and cost of materials.

While the invention has been described in respect of hose pipes it is to be understood that the invention is equally applicable to other flexible articles, such as conveyor belts, in which it is desired to provide protective surface layers adjacent a body portion of the article.

Having now described my invention — what I claim is:

1. A flexible hose comprising a reinforcing body including rubber polymeric material and having a thin protective abrasion resistant open structured non-woven surface layer of substantially randomly arranged thermoplstic filaments impregnated with a rubber polymeric material on the body, reinforcement of the hose being provided substantially only by the reinforcing body.

2. A flexible article according to claim 1 wherein the polymeric material which impregnates the non-woven filamentary material forms a film adjacent one surface of the non-woven filamentary material.

3. A flexible article according to claim 2 wherein the surface layer is formed from one or more strips in each of which strips the film of polymeric material extends beyond the non-woven filamentary material to provide an overlapping edge portion of polymeric material.

4. A flexible article according to claim 1 wherein the non-woven filamentary material is impregnated with a natural or synthetic latex rubber composition.

5. A flexible article according to claim 1 wherein the non-woven filamentary material has a thickness between 0.003 of an inch and 0.010 of an inch.

6. A flexible article according to claim 1 wherein the thermoplastic filaments are interconnected at their cross-over points.

7. A flexible article according to claim 6 wherein the filaments are bonded together at their cross-over points by means of a solvent.

8. A flexible article according to claim 6 wherein the filaments are welded together at their cross-over points under the combined action of heat and pressure.

9. A hose pipe according to claim 1 wherein the surface layer comprises a strip of non-woven filamentary material wound helically adjacent a surface of the body.

10. A hose pipe according to claim 1 wherein the surface layer comprises at least one strip of non-woven filamentary material applied substantially parallel to the longitudinal axis of the body.

11. A hose pipe according to claim 1 wherein the surface layer forms an inner lining of the body.

12. A hose pipe according to claim 1 wherein the surface layer forms an outer cover of the body.

* * * * *

UNITED STATES PATENT AND TRADEMARK OFFICE
CERTIFICATE OF CORRECTION

PATENT NO. : 3,957,085
DATED : May 18, 1976
INVENTOR(S) : Eric BALL

It is certified that error appears in the above-identified patent and that said Letters Patent are hereby corrected as shown below:

Claim 1, Column 4, line 22, correct the spelling of "thermoplastic"; and

Claims 2 - 8, Column 4, lines 26, 30, 35, 38, 41, 44 and 47, change "article" to --- hose ---.

Signed and Sealed this

Twenty-eighth Day of September 1976

[SEAL]

Attest:

RUTH C. MASON
*Attesting Officer*

C. MARSHALL DANN
*Commissioner of Patents and Trademarks*